United States Patent [19]

Esmond

[11] 4,054,333
[45] Oct. 18, 1977

[54] BEARING UNIT

[76] Inventor: William G. Esmond, 800 Country Club Road, Havre de Grace, Md. 21078

[21] Appl. No.: 711,827

[22] Filed: Aug. 5, 1976

[51] Int. Cl.² ............................................. F16C 17/16
[52] U.S. Cl. ..................................... 308/6 C; 308/10
[58] Field of Search ......................... 308/6 C, 216, 10

[56] References Cited
U.S. PATENT DOCUMENTS

| | | | |
|---|---|---|---|
| 2,922,681 | 1/1960 | Bayre | 308/216 X |
| 3,011,842 | 12/1961 | Norris | 308/10 X |
| 3,887,246 | 6/1975 | McCloskey | 308/6 C |
| 3,895,846 | 7/1975 | Edwards | 308/10 |

Primary Examiner—Joseph F. Peters, Jr.
Assistant Examiner—Gene A. Church
Attorney, Agent, or Firm—Diller, Brown, Ramik & Wight

[57] ABSTRACT

This disclosure relates to a bearing unit wherein the rolling elements are supplied with at least one of the raceways, and wherein the rolling elements are formed of a magnetically attractable material and that raceway which is furnished with the rolling elements has been treated to have magnetic characteristics wherein the rolling elements are permanently magnetically attracted to the raceway by a force sufficient to overcome gravitational forces normally urging the rolling elements away from the raceway.

6 Claims, 4 Drawing Figures

U.S. Patent     Oct. 18, 1977     4,054,333
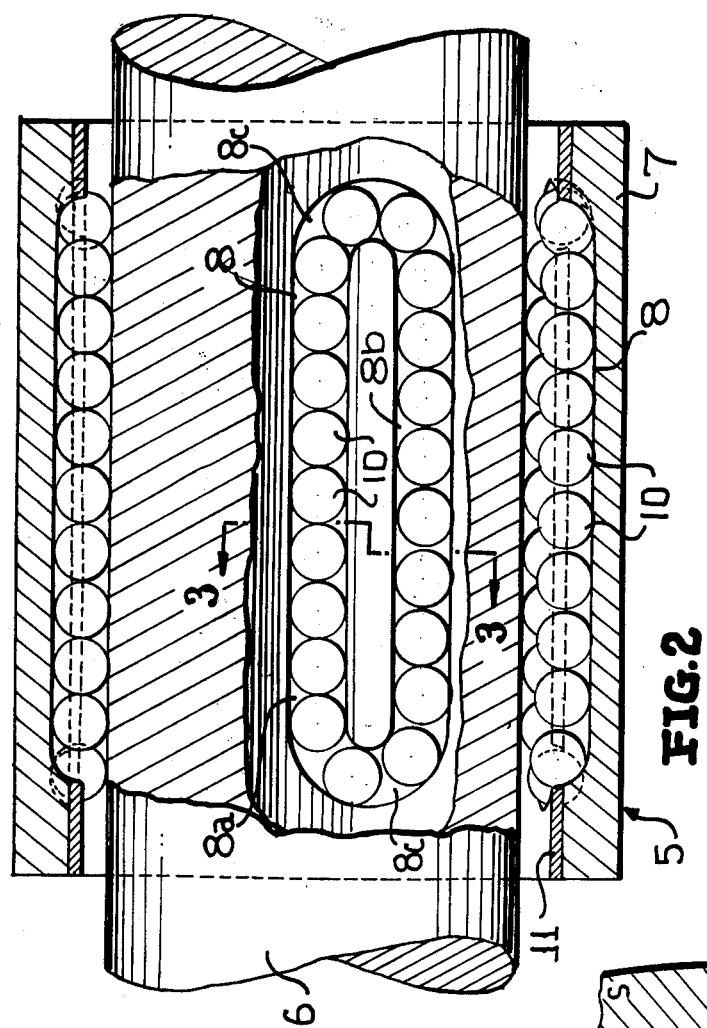
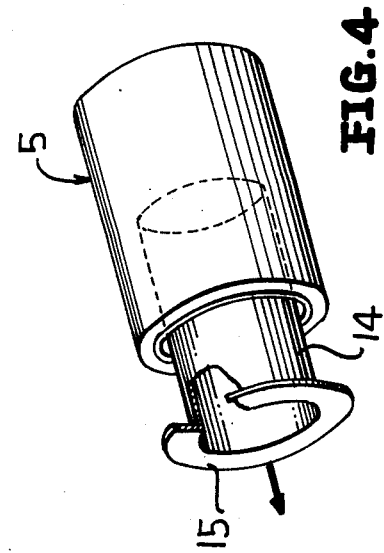
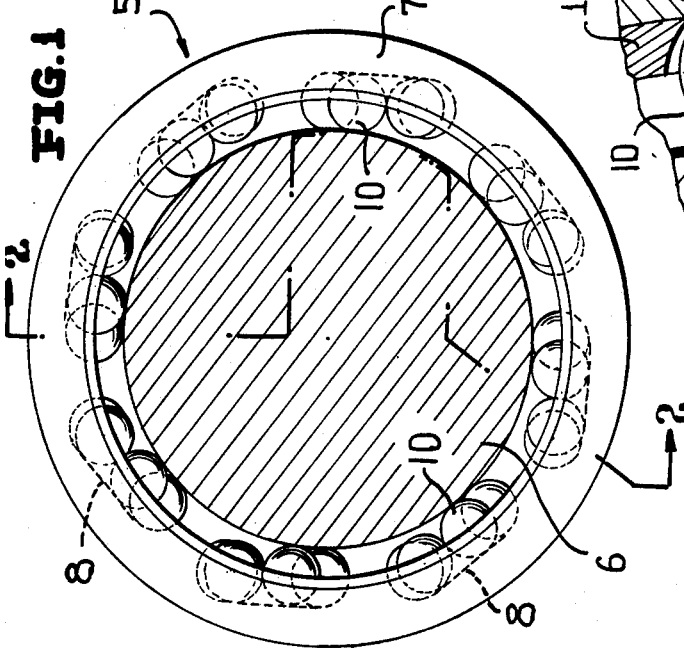

BEARING UNIT

This invention relates in general to new and useful improvements in bearing constructions, and more particularly to a novel bearing unit of the type including at least one raceway and rolling elements engaging the raceway wherein the rolling elements are magnetically attracted to the raceway by a force at least sufficient to overcome gravitational forces normally urging the rolling elements away from the raceway.

In the usual bearing construction, only certain of the rolling elements thereof are in the load zone at one time with the result that the other rolling elements are merely inactive and are traveling back towards the load zone. When the rolling elements contact both race surfaces, they have a tendency to slide rather than to rotate and scuffing occurs. This scuffing will result in flat spots being formed on the rolling elements and thus, greatly decrease the life of the bearing.

In accordance with this invention, it is proposed to form the rolling elements of magnetically attractable material and to treat one of the raceways to have magnetic characteristics such that the rolling elements are normally attracted to the one raceway and roll along that raceway while remaining out of contact with the other of the raceways.

While the invention is applicable to all types of bearings, it is particularly applicable to bearings of the recirculating linear motion type wherein there are plural sets of rolling elements and the rolling elements of each set has two longitudinal paths connected by return portions, one of the paths being an active path and the other being a return path.

With the above and other objects in view that will hereinafter appear, the nature of the invention will be more clearly understood by reference to the following detailed description, the appended claimed subject matter, and the several views illustrated in the accompanying drawing.

IN THE DRAWINGS

FIG. 1 is an end elevational view of a bearing unit of the recirculating linear motion type and shows the same associated with a shaft which is illustrated in section.

FIG. 2 is a longitudinal sectional view taken generally along the line 2—2 of FIG. 1 and shows more specifically the construction of the bearing unit.

FIG. 3 is an enlarged fragmentary sectional view taken generally along the line 3—3 of FIG. 2 and shows the relationship of the rolling elements of a single recirculating path.

FIG. 4 is a perspective view on a reduced scale of the bearing unit and shows the same initially associated with a shipping tube, which shipping tube has a portion there broken away and shown in section.

Referring now to the drawings in detail, it will be seen that there is illustrated a bearing unit incorporating the spirit of the invention. The bearing unit being generally identified by the numeral 5, the bearing unit 5 is of the recirculating ball linear motion type and is illustrated in FIGS. 1-3 in conjunction with a shaft 6. It is to be understood that the bearing unit 5 will be mounted in a suitable housing (not shown) and that the housing will be either of the stationary type and the shaft 6 being axially movable through the bearing unit 5, or the housing will be of the movable type and movable together with the bearing unit 5 axially of the shaft 6.

The bearing unit 5 includes a race member 7 having formed therein a plurality of circumferentially spaced axially extending raceways 8. Each of the raceways 8 includes a longitudinally extending load receiving portion 8a, a generally longitudinally extending return portion 8b and direction changing portions 8c joining the ends of the portions 8a and 8b. As is best illustrated in FIG. 3, the raceway 8 is in the form of a groove formed in the innersurface of the race member 7 with that portion of that groove defining the return portion 8b being deeper that that portion of the groove forming the load receiving 8a. Seated in each raceway 8 is a full compliment of rolling elements 10, which in the illustrated form of the invention are in the form of balls. The relative dimensions of the diameters of the shaft 6, the internal surface of the race members 7 and the rolling elements 10, together with the depth of the groove along the load receiving portion 8a is set so as to provide for a relative supporting relationship between the shaft 6 and the race member 7 through the rolling elements 10 dispose along the raceway portion 8a.

The depth of the return portion 8b is such that the rolling elements tend disposed therein will be spaced from the surface of the shaft 6 a distance on the order of 0.0003 to 0.0005 inch. The differential in depth of the groove portion 8a and 8b need only be such to assure that the rolling elements 10 received within the return portion 8b are completely free of contact from the shaft 6 during the operation of the bearing unit 5.

As stated above, in accordance with the invention, rolling elements 10 are formed of a magnetically attractive material. This, of course, includes the conventional carbon steels which are utilized in the manufacture of rolling elements for bearings, such as rollers and balls. Further, the race member 7 has been so treated wherein it has magnetic characteristics, particularly along the raceways 8 so as to magnetically hold the rolling elements 10 within the groove defining each raceway 8 as is clearly illustrated in FIGS. 1 and 3.

The bearing unit 7 also includes a mask 11 which is formed of a non-magnetic material. Copper, aluminum, plastics, and the like are satisfactory materials. It is to be noted that the mask 11 is of a cylindrical configuration dimensioned to be bonded within the interior of the race member 7. Further, the mask 11 has formed therein notches 12 which generally correspond to the grooves defining the raceways 8 and aligned therewith. The purpose of the mask 11 is to minimize the magnetic attraction of the rolling elements 10 by the race member 7 normal to the radial magnetic attraction of the race member 7 by the rolling elements 10 thereby. The thickness of the mask 11 may be varied in accordance with the diameter of the rolling element 10 and the spacing between the race member 7 and the shaft 6 to make certain that the rolling elements 10 are urged radially outwardly into the raceways 8. The mask 11 is in no way intended to function as a retainer for the rolling elements 10.

Referring now to FIG. 4, it will be seen that the bearing unit 5 may be provided with a shipping tube 14. The shipping tube 14 will be of a size corresponding to that of the shaft 6 so as to fit tightly within the bearing unit 5 and thus prevent the displacement of the rolling elements 10 therewithin. The shipping tube may be formed of any suitable material, including inexpensive plastic material and may be equipped with a flange 15 to facilitate the withdrawal thereof.

It is to be understood that the shipping tube 14 serves primarily to retain the rolling elements 10 within their respective raceways against impact, such as if the bearing unit 5 is dropped. Otherwise, the magnetic attraction of the race member 7 with respect to the rolling elements 10 will be sufficient to retain the rolling elements 10 in place. When it is desired to mount the bearing unit 5 on the shaft 6, the shipping tube 14 is removed and the bearing unit is merely slid over the shaft 6 in a customary manner without any necessity of retaining the rolling elements 10 due to the magnetic attraction of the race member 7 thereon.

Although an embodiment of bearing has been specifically illustrated and described herein, it is to be understood that the principles of this invention may be equally as well utilized with other type of bearing units without departing from the spirit or the scope of the invention as defined by the claims.

I claim:

1. A bearing unit particularly adapted for association with a separate race surface, said bearing unit comprising a race member having at least a portion thereof defining a raceway, rolling elements engaging said raceway, said rolling elements being formed of magnetically attractable material, and at least said raceway having magnetic characteristics with said rolling elements being magnetically attracted to said raceway by a force sufficient to overcome gravitational forces normally urging said rolling elements away from said raceway.

2. A bearing unit according to claim 1 wherein a non-magnetic mask is carried by said race member between circumferentially adjacent ones of said rolling elements for shielding said race member relative to a cooperating race surface between circumferentially adjacent ones of said rolling elements.

3. A bearing unit according to claim 1 wherein said bearing unit is of the recirculating linear motion type and there are a plurality of said raceways arranged in circumferentially spaced relation, each of said raceways being in the form of a continuous groove formed in a surface of said race member; said raceway including a longitudinally extending load receiving portion, a circumferentially adjacent longitudinal extending return portion, and two direction changing portions connecting adjacent ends of said load receiving portion and said return portion.

4. A bearing unit according to claim 3 wherein said load receiving portion is of a lesser depth than said return portion with rolling elements passing along said load receiving portion projecting radially from said race member for engaging an associated race surface and rolling elements passing along said return portion are relatively radially recessed for movement in radially spaced relation relative to an associated race surface.

5. A bearing unit according to claim 4 wherein the depths have a differential on the order of 0.0003 to 0.0005 inch.

6. A bearing unit according to claim 4 wherein that surface of said race member having said raceways formed therein is provided with a mask formed of non-magnetic material, and said mask having rolling element receiving slots therein aligned with said raceways and restricting the magnetic influence of said race member substantially to said rolling elements.

* * * * *